US010771475B2

(12) United States Patent
Chen et al.

(10) Patent No.: US 10,771,475 B2
(45) Date of Patent: Sep. 8, 2020

(54) TECHNIQUES FOR EXCHANGING CONTROL AND CONFIGURATION INFORMATION IN A NETWORK VISIBILITY SYSTEM

(71) Applicant: Extreme Networks, Inc., San Jose, CA (US)

(72) Inventors: Xiaochu Chen, San Ramon, CA (US); Arvindsrinivasan Lakshmi Narasimhan, San Jose, CA (US); Shailender Sharma, Karnataka (IN); Ivy Pei-Shan Hsu, Dublin, CA (US); Sanjeev Chhabria, Castro Valley, CA (US); Rakesh Varimalla, Karnataka (IN)

(73) Assignee: Extreme Networks, Inc., San Jose, CA (US)

( * ) Notice: Subject to any disclaimer, the term of this patent is extended or adjusted under 35 U.S.C. 154(b) by 535 days.

(21) Appl. No.: 14/848,586

(22) Filed: Sep. 9, 2015

(65) Prior Publication Data
US 2016/0285762 A1 Sep. 29, 2016

Related U.S. Application Data

(60) Provisional application No. 62/137,073, filed on Mar. 23, 2015.

(51) Int. Cl.
H04L 29/06 (2006.01)
H04L 12/24 (2006.01)
(Continued)

(52) U.S. Cl.
CPC ...... H04L 63/1408 (2013.01); H04L 41/0816 (2013.01); H04L 45/02 (2013.01); H04L 45/745 (2013.01); H04W 88/16 (2013.01)

(58) Field of Classification Search
USPC .......................................................... 370/338
See application file for complete search history.

(56) References Cited

U.S. PATENT DOCUMENTS 5,031,094 A 7/1991 Toegel et al.
5,359,593 A 10/1994 Derby et al.
(Continued)

FOREIGN PATENT DOCUMENTS

CN 101677292 3/2010
EP 2654340 A1 10/2013
(Continued)

OTHER PUBLICATIONS

Notice of Allowance for U.S. Appl. No. 13/584,534 dated Jan. 6, 2016, 4 pages.
(Continued)

Primary Examiner — Alpus Hsu
Assistant Examiner — Hooman Houshmand
(74) Attorney, Agent, or Firm — Sterne, Kessler, Goldstein & Fox P.L.L.C.

(57) ABSTRACT

Techniques for exchanging control and configuration information in a network visibility system are provided. In one embodiment, a control plane component of the network visibility system can receive one or more first messages from a data plane component of the network visibility system, where the one or more first messages define one or more forwarding resources available on the data plane component. The control plane component can further retrieve configuration information stored on the control plane component that comprises one or more network prefixes to be monitored by the network visibility system, and can determine one or more mappings between the network prefixes and the forwarding resources. Upon determining the one or more mappings, the control plane component can (Continued)

generate one or more packet forwarding rules based on the mappings. Finally, the control plane component can transmit one or more second messages to the data plane component that include the packet forwarding rules for programming on the data plane component.

18 Claims, 8 Drawing Sheets

(51) Int. Cl.
  *H04L 12/751* (2013.01)
  *H04L 12/741* (2013.01)
  *H04W 88/16* (2009.01)

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sitanizadeh et al. |
| 6,681,323 B1 | 1/2004 | Fontsnesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,086 B1 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,095,738 B1 | 8/2006 | Desanti |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,177,943 B1 | 2/2007 | Temoshenko et al. |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Smith |
| 7,454,500 B1 | 11/2008 | Hsu et al. |
| 7,483,374 B2 | 1/2009 | Nilakantan et al. |
| 7,492,713 B1 | 2/2009 | Turner et al. |
| 7,506,065 B2 | 3/2009 | LaVigne et al. |
| 7,539,134 B1 | 5/2009 | Bowes |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |
| 7,701,957 B1 * | 4/2010 | Bicknell ............ H04L 12/4625 370/380 |
| 7,706,363 B1 | 4/2010 | Daniel et al. |
| 7,716,370 B1 | 5/2010 | Devarapalli |
| 7,720,066 B2 | 5/2010 | Weyman et al. |

(56) References Cited

U.S. PATENT DOCUMENTS

| | | | |
|---|---|---|---|
| 7,720,076 B2 | 5/2010 | Dobbins et al. |
| 7,746,789 B2 | 6/2010 | Katoh et al. |
| 7,747,737 B1 | 6/2010 | Apte et al. |
| 7,756,965 B2 | 7/2010 | Joshi |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasralikar |
| 7,835,358 B2 | 11/2010 | Gallatin et al. |
| 7,840,678 B2 | 11/2010 | Joshi |
| 7,848,326 B1 | 12/2010 | Leong et al. |
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,018,943 B1 | 9/2011 | Pleshek et al. |
| 8,208,494 B2 | 6/2012 | Leong |
| 8,238,344 B1 | 8/2012 | Chen et al. |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |
| 8,457,126 B2 * | 6/2013 | Breslin | H04L 45/00 370/390 |
| 8,477,785 B2 | 7/2013 | Kant et al. |
| 8,504,721 B2 | 8/2013 | Hsu et al. |
| 8,514,718 B2 | 8/2013 | Zijst |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,706,118 B2 | 4/2014 | Jaiswal et al. |
| 8,824,466 B2 | 9/2014 | Won et al. |
| 8,830,819 B2 | 9/2014 | Leong et al. |
| 8,873,557 B2 | 10/2014 | Nguyen |
| 8,891,527 B2 | 11/2014 | Wang |
| 8,897,138 B2 | 11/2014 | Yu et al. |
| 8,953,458 B2 | 2/2015 | Leong et al. |
| 9,155,075 B2 | 10/2015 | Song et al. |
| 9,264,446 B2 | 2/2016 | Goldfarb et al. |
| 9,270,566 B2 | 2/2016 | Wang et al. |
| 9,270,592 B1 | 2/2016 | Sites |
| 9,294,367 B2 | 3/2016 | Natarajan et al. |
| 9,356,866 B1 | 5/2016 | Sivaramakrishnan et al. |
| 9,380,002 B2 | 6/2016 | Johansson et al. |
| 9,479,415 B2 | 10/2016 | Natarajan et al. |
| 9,565,138 B2 | 2/2017 | Chen et al. |
| 9,648,542 B2 | 5/2017 | Hsu et al. |
| 10,057,126 B2 | 8/2018 | Vedam et al. |
| 10,129,088 B2 | 11/2018 | Sharma et al. |
| 2001/0049741 A1 | 12/2001 | Skene et al. |
| 2001/0052016 A1 | 12/2001 | Skene et al. |
| 2002/0001304 A1 * | 1/2002 | Johnson | H04L 49/1576 370/360 |
| 2002/0009081 A1 | 1/2002 | Sampath et al. |
| 2002/0016856 A1 | 2/2002 | Tallegas et al. |
| 2002/0018796 A1 | 2/2002 | Wironen |
| 2002/0023089 A1 | 2/2002 | Woo |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0105966 A1 | 8/2002 | Patel et al. |
| 2002/0112036 A1 | 8/2002 | Bohannan et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0023744 A1 | 1/2003 | Sadot et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0086415 A1 | 5/2003 | Bernhard et al. |
| 2003/0097460 A1 | 5/2003 | Higashiyarna et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0214929 A1 | 11/2003 | Bichot et al. |
| 2003/0229697 A1 | 12/2003 | Borella |
| 2004/0013112 A1 | 1/2004 | Goldberg et al. |
| 2004/0019680 A1 | 1/2004 | Chao et al. |
| 2004/0024872 A1 | 2/2004 | Kelley et al. |
| 2004/0032868 A1 | 2/2004 | Oda et al. |
| 2004/0064577 A1 | 4/2004 | Dahlin et al. |
| 2004/0184440 A1 | 9/2004 | Higuchi et al. |
| 2004/0194102 A1 | 9/2004 | Neerdaels |
| 2004/0243718 A1 | 12/2004 | Fujiyoshi |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0050136 A1 | 3/2005 | Golla |
| 2005/0060418 A1 | 3/2005 | Sorokopud |
| 2005/0060427 A1 | 3/2005 | Phillips et al. |
| 2005/0068933 A1 * | 3/2005 | Kokkonen | H04L 45/00 370/349 |
| 2005/0086295 A1 | 4/2005 | Cunningham et al. |
| 2005/0108518 A1 | 5/2005 | Pandya |
| 2005/0149531 A1 | 7/2005 | Srivastava |
| 2005/0169180 A1 | 8/2005 | Ludwig |
| 2005/0190695 A1 | 9/2005 | Phaal |
| 2005/0207417 A1 | 9/2005 | Ogawa et al. |
| 2005/0271003 A1 * | 12/2005 | Devarapalli | H04L 29/12009 370/328 |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1 | 6/2006 | See et al. |
| 2006/0256721 A1 | 11/2006 | Yarlagadda et al. |
| 2007/0044141 A1 | 2/2007 | Lor et al. |
| 2007/0053296 A1 | 3/2007 | Yazaki et al. |
| 2007/0171918 A1 | 7/2007 | Ota et al. |
| 2007/0195761 A1 | 8/2007 | Tatar et al. |
| 2007/0233891 A1 | 10/2007 | Luby et al. |
| 2008/0002591 A1 | 1/2008 | Ueno |
| 2008/0028077 A1 | 1/2008 | Kamata et al. |
| 2008/0031141 A1 | 2/2008 | Lean et al. |
| 2008/0089336 A1 | 4/2008 | Mercier et al. |
| 2008/0137660 A1 | 6/2008 | Olakangil et al. |
| 2008/0159141 A1 | 7/2008 | Soukup et al. |
| 2008/0177896 A1 * | 7/2008 | Quinn | G06F 9/5055 709/238 |
| 2008/0181119 A1 | 7/2008 | Beyers |
| 2008/0195731 A1 | 8/2008 | Harmel et al. |
| 2008/0225710 A1 | 9/2008 | Raja et al. |
| 2008/0304423 A1 | 12/2008 | Chuang et al. |
| 2009/0135835 A1 | 5/2009 | Gallatin et al. |
| 2009/0240644 A1 | 9/2009 | Boettcher et al. |
| 2009/0262741 A1 | 10/2009 | Jungck et al. |
| 2009/0262745 A1 | 10/2009 | Leong et al. |
| 2009/0323703 A1 | 12/2009 | Bragagnini et al. |
| 2010/0011126 A1 | 1/2010 | Hsu et al. |
| 2010/0135323 A1 | 6/2010 | Leong |
| 2010/0209047 A1 | 8/2010 | Cheung et al. |
| 2010/0228974 A1 | 9/2010 | Watts et al. |
| 2010/0268761 A1 | 10/2010 | Masson |
| 2010/0293293 A1 | 11/2010 | Beser |
| 2010/0293296 A1 | 11/2010 | Hsu et al. |

(56) References Cited

U.S. PATENT DOCUMENTS

| | | |
|---|---|---|
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0075675 A1 | 3/2011 | Koodli et al. |
| 2011/0134749 A1 | 6/2011 | Speks et al. |
| 2011/0206055 A1 | 8/2011 | Leong |
| 2011/0211443 A1 | 9/2011 | Leong et al. |
| 2011/0216771 A1 | 9/2011 | Gallatin et al. |
| 2011/0249682 A1 | 10/2011 | Kean et al. |
| 2011/0280149 A1 | 11/2011 | Okada et al. |
| 2011/0317678 A1* | 12/2011 | Allan ............... H04L 12/4662 370/338 |
| 2012/0023340 A1 | 1/2012 | Cheung |
| 2012/0103518 A1 | 5/2012 | Kakimoto et al. |
| 2012/0155389 A1 | 6/2012 | McNamee et al. |
| 2012/0157088 A1 | 6/2012 | Gerber et al. |
| 2012/0185563 A1 | 7/2012 | Sugiyama et al. |
| 2012/0201137 A1 | 8/2012 | Le Faucheur et al. |
| 2012/0226801 A1* | 9/2012 | Velaga ............... H04L 67/1097 709/224 |
| 2012/0243533 A1 | 9/2012 | Leong |
| 2012/0257635 A1 | 10/2012 | Gallatin et al. |
| 2012/0275311 A1 | 11/2012 | Ivershen |
| 2013/0007257 A1 | 1/2013 | Ramaraj et al. |
| 2013/0010613 A1 | 1/2013 | Cafarelli et al. |
| 2013/0028072 A1 | 1/2013 | Addanki |
| 2013/0031575 A1 | 1/2013 | Gallant et al. |
| 2013/0034107 A1 | 2/2013 | Leong et al. |
| 2013/0124707 A1 | 5/2013 | Anantliapadmanabha et al. |
| 2013/0151686 A1 | 6/2013 | Takaoka et al. |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0259037 A1 | 10/2013 | Natarajan et al. |
| 2013/0272135 A1 | 10/2013 | Leong |
| 2013/0272136 A1* | 10/2013 | Ali ............... H04W 24/08 370/241 |
| 2013/0318243 A1 | 11/2013 | Chinthalapati et al. |
| 2013/0322236 A1* | 12/2013 | Bahadur ............ H04L 12/4633 370/230 |
| 2014/0016500 A1 | 1/2014 | Leong et al. |
| 2014/0022916 A1 | 1/2014 | Natarajan et al. |
| 2014/0029451 A1 | 1/2014 | Nguyen |
| 2014/0036918 A1 | 2/2014 | Varvello et al. |
| 2014/0040478 A1 | 2/2014 | Hsu et al. |
| 2014/0086097 A1* | 3/2014 | Qu ............... H04L 45/026 370/254 |
| 2014/0101297 A1 | 4/2014 | Neisinger et al. |
| 2014/0204747 A1 | 7/2014 | Yu et al. |
| 2014/0219100 A1 | 8/2014 | Pandey et al. |
| 2014/0233399 A1 | 8/2014 | Mann et al. |
| 2014/0321278 A1 | 10/2014 | Cafarelli et al. |
| 2014/0372616 A1 | 12/2014 | Arisoylu et al. |
| 2015/0009828 A1 | 1/2015 | Murakami |
| 2015/0009830 A1 | 1/2015 | Bisht et al. |
| 2015/0023176 A1* | 1/2015 | Korja ............... H04L 45/42 370/236 |
| 2015/0033169 A1 | 1/2015 | Lection et al. |
| 2015/0055640 A1* | 2/2015 | Wang ............... H04W 60/00 370/338 |
| 2015/0071171 A1 | 3/2015 | Akiyoshi |
| 2015/0103824 A1 | 4/2015 | Tanabe |
| 2015/0124622 A1 | 5/2015 | Kovvali et al. |
| 2015/0142935 A1 | 5/2015 | Srinivas et al. |
| 2015/0170920 A1 | 6/2015 | Purayath et al. |
| 2015/0172219 A1* | 6/2015 | Johansson ............... H04L 49/25 370/419 |
| 2015/0180802 A1 | 6/2015 | Chen et al. |
| 2015/0195192 A1 | 7/2015 | Vasseur et al. |
| 2015/0207905 A1 | 7/2015 | Merchant et al. |
| 2015/0215841 A1 | 7/2015 | Hsu et al. |
| 2015/0256436 A1 | 9/2015 | Stoyanov et al. |
| 2015/0263889 A1 | 9/2015 | Newton |
| 2015/0281125 A1 | 10/2015 | Koponen et al. |
| 2015/0319070 A1 | 11/2015 | Nachum |
| 2015/0326532 A1 | 11/2015 | Grant et al. |
| 2016/0036620 A1* | 2/2016 | Dunbar ............... H04L 12/4625 370/338 |
| 2016/0119234 A1 | 4/2016 | Valencia Lopez et al. |
| 2016/0149811 A1 | 5/2016 | Roch et al. |
| 2016/0164768 A1 | 6/2016 | Natarajan et al. |
| 2016/0182329 A1 | 6/2016 | Armolavicius et al. |
| 2016/0182378 A1 | 6/2016 | Basavaraja et al. |
| 2016/0204996 A1 | 7/2016 | Lindgren et al. |
| 2016/0226725 A1 | 8/2016 | Iizuka et al. |
| 2016/0248655 A1 | 8/2016 | Francisco et al. |
| 2016/0285735 A1 | 9/2016 | Chen et al. |
| 2016/0285763 A1 | 9/2016 | Laxman et al. |
| 2016/0308766 A1 | 10/2016 | Register et al. |
| 2016/0373303 A1 | 12/2016 | Vedam et al. |
| 2016/0373304 A1 | 12/2016 | Sharma et al. |
| 2016/0373351 A1 | 12/2016 | Sharma et al. |
| 2016/0373352 A1 | 12/2016 | Sharma et al. |
| 2017/0099224 A1 | 4/2017 | O'Connor et al. |
| 2017/0118102 A1 | 4/2017 | Majumder et al. |
| 2017/0187649 A1 | 6/2017 | Chen et al. |
| 2017/0237632 A1 | 8/2017 | Hegde et al. |
| 2017/0237633 A1 | 8/2017 | Hegde et al. |
| 2017/0279723 A1 | 9/2017 | Vedam et al. |
| 2017/0339022 A1 | 11/2017 | Hedge et al. |
| 2018/0109433 A1 | 4/2018 | Nagaraj et al. |
| 2019/0082342 A1 | 3/2019 | Sharma et al. |

FOREIGN PATENT DOCUMENTS

| | | |
|---|---|---|
| EP | 3206344 A2 | 8/2017 |
| EP | 3206345 A2 | 8/2017 |
| IE | 20070438 A1 | 2/2008 |
| IN | 201641010295 | 3/2016 |
| IN | 201641016960 | 5/2016 |
| IN | 201641035761 | 10/2016 |
| WO | 2010135474 A1 | 11/2010 |
| WO | 2015116538 A1 | 8/2015 |
| WO | 2015138513 A1 | 9/2015 |

OTHER PUBLICATIONS

U.S. Appl. No. 12/272,618, Final Office Action dated May 5, 2014, 13 pages.

U.S. Appl. No. 12/272,618, NonFinal Office Action dated Jul. 29, 2013, 13 pages.

U.S. Appl. No. 12/272,618, NonFinal Office Action dated Jan. 12, 2015, 5 pages.

U.S. Appl. No. 12/272,618, Notice of Allowance dated Aug. 26, 2015, 11 pages.

U.S. Appl. No. 12/272,618, Final Office Action dated Feb. 28, 2012, 12 pages.

U.S. Appl. No. 13/925,670, NonFinal Office Action dated Nov. 16, 2015, 48 pages.

U.S. Appl. No. 14/230,590, Notice of Allowance dated Sep. 23, 2015, 8 pages.

U.S. Appl. No. 15/043,421, Notice of Allowance dated Jun. 27, 2016, 21 pages.

U.S. Appl. No. 60/169,502, filed Dec. 7, 2009 by Yeejang James Lin.

U.S. Appl. No. 60/182,812, filed Feb. 16, 2000 by Skene et al.

U.S. Appl. No. 09/459,815, filed Dec. 13, 1999 by Skene et al.

Notice of Allowance for U.S. Appl. No. 13/584,534 dated Dec. 16, 2015, 7 pages.

Delgadillo, "Cisco Distributed Director", White Paper, 1999, at URL:http://www-europe.cisco.warp/public/751/ distdir/dd_wp. htm, (19 pages) with Table of Contents for TeleCon (16 pages).

Cisco LocalDirector Version 1.6.3 Release Notes, Oct. 1997, Cisco Systems, Inc. Doc No. 78-3880-05.

"Foundry Networks Announces Application Aware Layer 7 Switching on ServerIron Platform," (Mar. 1999).

Foundry ServerIron Installation and Configuration Guide (May 2000), Table of Contents—Chapter 1-5, http://web.archive.org/web/20000815085849/http://www.foundrynetworks.com/techdocs/SI/index.html.

(56) References Cited

OTHER PUBLICATIONS

Foundry ServerIron Installation and Configuration Guide (May 2000), Chapter 6-10, http://web.archive.org/web/20000815085849/ http://www.foundrynetworks.com/techdocs/SI/index.html.
Foundry ServerIron Installation and Configuration Guide (May 2000), Chapter 11-Appendix C, http://web.archive.org/web/ 20000815085849/http://www.foundrynetworks.com/techdocs/SI/ index.html.
U.S. Appl. No. 14/921,484, NonFinal Office Action dated Aug. 9, 2017, 77 pages.
U.S. Appl. No. 14/848,677, Notice of Allowance dated Aug. 28, 2017, 31 pages.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
PCT Patent Application No. PCT/US2015/012915 filed on Jan. 26, 2015 by Hsu et al.
U.S. Appl. No. 14/320,138, filed Jun. 30, 2014 by Chen et al.
Non-Final Office Action for U.S. Appl. No. 11/827,524 dated Dec. 10, 2009, 15 pages.
Non-Final Office Action for U.S. Appl. No. 11/827,524 dated Jun. 2, 2010, 14 pages.
Non-Final Office Action for U.S. Appl. No. 11/827,524 dated Nov. 26, 2010, 16 pages.
Final Office Action for U.S. Appl. No. 11/827,524 dated May 6, 2011, 19 pages.
Advisory Action for U.S. Appl. No. 11/827,524 dated Jul. 14, 2011, 5 pages.
Non-Final Office Action for U.S. Appl. No. 11/827,524 dated Oct. 18, 2012, 24 pages.
Notice of Allowance for U.S. Appl. No. 11/827,524 dated Jun. 25, 2013, 11 pages.
Non-Final Office Action for U.S. Appl. No. 14/030,782 dated Oct. 6, 2014, 14 pages.
IBM User Guide, Version 2.1AIX, Solaris and Windows NT, Third Edition (Mar. 1999) 102 Pages.
White Paper, Foundry Networks, "Server Load Balancing in Today's Web-Enabled Enterprises" Apr. 2002 10 Pages.
International Search Report & Written Opinion for PCT Application PCT/US2015/012915 dated Apr. 10, 2015, 15 pages.
Gigamon: Vistapointe Technology Solution Brief; Visualize-Optimize-Monetize-3100-02; Feb. 2014; 2 pages.
Gigamon: Netflow Generation Feature Brief; 3099-04; Oct. 2014; 2 pages.
Gigamon: Unified Visibility Fabric Solution Brief; 3018-03; Jan. 2015; 4 pages.
Gigamon: Active Visibility for Multi-Tiered Security Solutions Overview; 3127-02; Oct. 2014; 5 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Service Provider System Reference Architecture for the Visibility Fabric White Paper; 5004-01; Mar. 2014; 11 pages.
Gigamon: Unified Visibility Fabric—A New Approach to Visibility White Paper; 3072-04; Jan. 2015; 6 pages.
Gigamon: The Visibility Fabric Architecture—A New Approach to Traffic Visibility White Paper; 2012-2013; 8 pages.
Ixia: Creating a Visibility Architecture—a New Perspective on Network Visibilty White Paper; 915-6581-01 Rev. A, Feb. 2014; 14 pages.
Gigamon: Unified Visibility Fabric; https://www.gigamon.com/ unfied-visibility-fabric; Apr. 7, 2015; 5 pages.
Gigamon: Application Note Stateful GTP Correlation; 4025-02; Dec. 2013; 9 pages.
Brocade and IBM Real-Time Network Analysis Solution; 2011 Brocade Communications Systems, Inc.; 2 pages.
Ixia Anue GTP Session Controller; Solution Brief; 915-6606-01 Rev. A, Sep. 2013; 2 pages.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Gigamon: Visibility Fabric Architecture Solution Brief; 2012-2013; 2 pages.
Gigamon: Visibility Fabric; More than Tap and Aggregation.bmp; 2014; 1 page.
ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
Gigamon: GigaVUE-HB1 Data Sheet; 4011-07; Oct. 2014; 4 pages.
Brocade IP Network Leadership Technology; Enabling Non-Stop Networking for Stackable Switches with Hitless Failover; 2010; 3 pages.
U.S. Appl. No. 60/998,410, filed Oct. 9, 2007 by Wang et al.
Non-Final Office Action for U.S. Appl. No. 13/584,534 dated Oct. 24, 2014, 24 pages.
Restriction Requirement for U.S. Appl. No. 13/584,534 dated Jul. 21, 2014, 5 pages.
Non-Final Office Action for U.S. Appl. No. 11/937,285 dated Jul. 6, 2009, 28 pages.
Final Office Action for U.S. Appl. No. 11/937,285 dated Mar. 3, 2010, 28 pages.
U.S. Appl. No. 15/205,889, filed Jul. 8, 2016 by Hegde et al.
U.S. Appl. No. 15/206,008, filed Jul. 8, 2016 by Hegde et al.
U.S. Appl. No. 14/603,304, NonFinal Office Action dated Aug. 1, 2016, 86 pages.
Non-Final Office Action for U.S. Appl. No. 11/937,285 dated Aug. 17, 2010, 28 pages.
Final Office Action for U.S. Appl. No. 11/937,285 dated Jan. 20, 2011, 41 pages.
Final Office Action for U.S. Appl. No. 11/937,285 dated May 20, 2011, 37 pages.
Non-Final Office Action for U.S. Appl. No. 11/937,285 dated Nov. 28, 2011, 40 pages.
Notice of Allowance for U.S. Appl. No. 11/937,285 dated Jun. 5, 2012, 10 pages.
Gigamon: Adaptive Packet Filtering; Feature Brief; 3098-03 Apr. 2015; 3 pages.
Final Office Action for U.S. Appl. No. 14/030,782 dated Jul. 29, 2015, 14 pages.
Final Office Action for U.S. Appl. No. 13/584,534 dated Jun. 25, 2015, 21 pages.
U.S. Appl. No. 14/603,304, filed Jan. 22, 2015 by Hsu et al.
U.S. Appl. No. 14/927,478, filed Oct. 30, 2015 by Vedam et al.
U.S. Appl. No. 14/927,479, filed Oct. 30, 2015 by Sharma et al.
U.S. Appl. No. 14/927,482, filed Oct. 30, 2015 by Sharma et al.
U.S. Appl. No. 14/927,484, filed Oct. 30, 2015 by Sharma et al.
nGenius Subscriber Intelligence, http://www.netscout.com/uploads/ 2015/03NetScout_DS_Subscriber_Intelligence_SP.pdf, downloaded circa Mar. 23, 2015, pp. 1-6.
Xu et al: Cellular Data Network Infrastructure Characterization and Implication on Mobile Content Placement, Sigmetrics '11 Proceedings of the ACM SIGMETRICS joint international conference on Measurement and modeling of computer systems, date Jun. 7-11, 2011, pp. 1-12, ISBN: 978-1-4503-0814-4 ACM New York, NY, USA copyright 2011.
E.H.T.B. Brands, Flow-Based Monitoring of GTP Trac in Cellular Networks, Date: Jul. 20, 2012, pp. 1-64, University of Twente, Enschede, The Netherlands.

(56) References Cited

OTHER PUBLICATIONS

Qosmos DeepFlow: Subscriber Analytics Use Case, http://www.qosmos.com/wp-content/uploads/2014/01/Qosmos-DeepFlow-Analytics-use-case-datasheet-Jan-2014.pdf, date Jan. 2014, pp. 1-2.
Configuring GTM to determine packet gateway health and availability, https://support.f5.com/kb/en-us/products/big-ip_gtm/manuals/product/gtm-implementations-11-6-0/9.html, downloaded circa Mar. 23, 2015, pp. 1-5.
ExtraHop-Arista Persistent Monitoring Architecture for SDN, downloaded circa Apr. 2, 2015, pp. 1-5.
7433 GTP Session Controller, www.ixia.com, downloaded circa Apr. 2, 2015, pp. 1-3.
Stateful GTP Correlation, https://www.gigamon.com/PDF/appnote/AN-GTP-Correlation-Stateful-Subscriber-Aware-Filtering-4025.pdf, date 2013, pp. 1-9.
GigaVUE-2404 // Data Sheet, www.gigamon.com, date Feb. 2014, pp. 1-6.
nGenius Performance Manager, www.netscout.com, date Mar. 2014, pp. 1-8.
GigaVUE-VM // Data Sheet, www.gigamon.com, date Oct. 2014, pp. 1-3.
Unified Visibility Fabric an Innovative Approach, https://www.gigamon.com/unified-visibility-fabric, Downloaded circa Mar. 30, 2015, pp. 1-4.
adaptiv.io and Apsalar Form Strategic Partnership to Provide Omnichannel Mobile Data Intelligence, http://www.businesswire.com/news/home/20150113005721/en/adaptivio-Apsalar-Form-Strategic-Partnership-Provide-Omni-channel, Downloaded circa Mar. 30, 2015, pp. 1-2.
Real-time Data Analytics with IBM InfoSphere Streams and Brocade MLXe Series Devices, www.brocade.com, date 2011, pp. 1-2.
Syniverse Proactive Roaming Data Analysis—VisProactive, http://m.syniverse.com/files/service_solutions/pdf/solutionsheet_visproactive_314.pdf.,date 2014, pp. 1-3.
Network Analytics: Product Overview, www.sandvine.com, date Apr. 28, 2014, pp. 1-2.
Non-Final Office Action for U.S. Appl. No. 15/043,421 dated Apr. 13, 2016, 18 pages.
U.S. Appl. No. 15/466,732, filed Mar. 22, 2017 by Hegde et al.
U.S. Appl. No. 15/467,766, filed Mar. 23, 2017 by Nagaraj et al.
U.S. Appl. No. 15/425,777, filed Feb. 6, 2017, by Chen et al.
Joshi et al.: A Review of Network Traffic Analysis and Prediction Techniques; arxiv.org; 2015; 22 pages.
Anjali et al.: MABE: A New Method for Available Bandwidth Estimation in an MPLS Network; submitted to World Scientific on Jun. 5, 2002; 12 pages.
Cisco Nexus Data Broker Scalable and Cost-Effective Solution for Network Traffic Visibility; Cisco 2015; 10 pages.
VB220-240G Modular 10G/1G Network Packet Broker; VSS Monitoring; 2016, 3 pages.
Big Tap Monitoring Fabric 4.5; Big Switch Networks; Apr. 2015; 8 pages.
Gigamon Intelligent Flow Mapping—Whitepaper; 3039-04; Apr. 2015; 5 pages.
Ixia White Paper; The Real Secret to Securing Your Network; Oct. 2014; 16 pages.
Accedian—Solution Brief; FlowBROKER; Feb. 2016; 9 pages.
Network Time Machine for Service Providers; NETSCOUT; http://enterprise.netscout.com/telecom-tools/lte-solutions/network-time-machine-service-providers; Apr. 18, 2017; 8 pages.
Arista EOS Central—Introduction to TAP aggregation; https://eos.arista.com/introduction-to-tap-aggregation/; Apr. 18, 2017; 6 pages.
Brocade Session Director—Data Sheet; 2016; https://www.brocade.com/content/dam/common/documents/content-types/datasheet/brocade-session-director-ds.pdf; 5 pages.
Ixia—Evaluating Inline Security Fabric: Key Considerations; White Paper; https://www.ixiacom.com/sites/default/files/2016-08/915-8079-01-S-WP-Evaluating%20Inline%20Security%20Fabric_v5.pdf; 10 pages.
Next-Generation Monitoring Fabrics for Mobile Networks; Big Switch Networks—White Paper; 2014; 9 pages.
Gigamon Adaptive Packet Filtering; Jan. 25, 2017; 3 pages.
VB220 Modular 10G.1G Network Packet Broker Datasheet; VSS Monitoring; 2016; 8 pages.
FlexaWare; FlexaMiner Packet Filter FM800PF; Jan. 27, 2017; 5 pages.
GL Communications Inc.; PacketBroker—Passive Ethernet Tap; Jan. 27, 2017; 2 pages.
International Search Report & Written Opinion for PCT Application PCT/US2017/025998 dated Jul. 20, 2017, 8 pages.
Ixia & VECTRA, Complete Visibility for a Stronger Advanced Persistent Threat (APT) Defense, pp. 1-2, May 30, 2016.
Extended European Search Report & Opinion for EP Application 17000212.5 dated Aug. 1, 2017, 9 pages.
Extended European Search Report & Opinion for EP Application 17000213.3 dated Aug. 1, 2017, 7 pages.
U.S. Appl. No. 14/320,138, Notice of Allowance dated Sep. 23, 2016, 17 pages.
U.S. Appl. No. 15/336,333, filed Oct. 27, 2016 by Vedam et al.
U.S. Appl. No. 14/603,304, Notice of Allowance dated Jan. 11, 2017, 13 pages.
U.S. Appl. No. 14/848,677, NonFinal Office Action dated Feb. 10, 2017, 83 pages.
Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.
Notice of Allowance for U.S. Appl. No. 14/030,782 dated Nov. 16, 2015, 20 pages.
U.S. Appl. No. 14/848,645, filed Sep. 9, 2015 by Chen et al.
U.S. Appl. No. 14/848,677, filed Sep. 9, 2015 by Laxman et al.
Non-Final Office Action for U.S. Appl. No. 14/320,138 dated Feb. 2, 2016, 30 pages.
Network Visibility and Analytics Service: Administration Guide. Brocade Communications Systems, Inc. Dated Dec. 19 2014; 72 pages.
Mobile Network Visibility Solution; Feature Specification and Design Implementation. Appendix F. Brocade Communications Systems, Inc. Dated Mar. 2014; 46 pages.
GTP Visibility 3G/4G GPRS/GTP Reference Guide. Appendix E. Brocade Communications Systems, Inc. Dated Mar. 12, 2014; 8 pages.
GTP Visibility Architecture. Appendix D. Brocade Communications Systems, Inc. Dated Mar. 15, 2014; 17 pages.
GTP Visibility Communication Protocol (GVCP) Specification. Appendix C. Brocade Communications Systems, Inc. Dated Oct. 6, 2014; 32 pages.
Network Visibility and Analytics TOI. Brocade Communications Systems, Inc. Appendix B. Dated Dec. 2014; 126 pages.

\* cited by examiner

TECHNIQUES FOR EXCHANGING CONTROL AND CONFIGURATION INFORMATION IN A NETWORK VISIBILITY SYSTEM

CROSS REFERENCES TO RELATED APPLICATIONS

The present application claims the benefit and priority under 35 U.S.C. 119(e) of U.S. Provisional Application No. 62/137,073, filed Mar. 23, 2015, entitled "TECHNIQUES FOR EXCHANGING CONTROL AND CONFIGURATION INFORMATION IN A NETWORK VISIBILITY SYSTEM." In addition, the present application is related to the following commonly-owned U.S. patent applications:

1. U.S. application Ser. No. 14/603,304, filed Jan. 22, 2015, entitled "SESSION-BASED PACKET ROUTING FOR FACILITATING ANALYTICS";
2. U.S. application Ser. No. 14/848,645, filed concurrently with the present application, entitled "TECHNIQUES FOR EFFICIENTLY PROGRAMMING FORWARDING RULES IN A NETWORK SYSTEM"; and
3. U.S. application Ser. No. 14/848,677, filed concurrently with the present application, entitled "TECHNIQUES FOR USER-DEFINED TAGGING OF TRAFFIC IN A NETWORK VISIBILITY SYSTEM."

The entire contents of the foregoing provisional and nonprovisional applications are incorporated herein by reference for all purposes.

BACKGROUND

Unless expressly indicated herein, the material presented in this section is not prior art to the claims of the present application and is not admitted to be prior art by inclusion in this section.

General Packet Radio Service (GPRS) is a standard for wireless data communications that allows 3G and 4G/LTE mobile networks to transmit Internet Protocol (IP) packets to external networks such as the Internet. FIG. 1 is a simplified diagram of an exemplary 3G network 100 that makes use of GPRS. As shown, 3G network 100 includes a mobile station (MS) 102 (e.g., a cellular phone, tablet, etc.) that is wirelessly connected to a base station subsystem (BSS) 104. BSS 104 is, in turn, connected to a serving GPRS support node (SGSN) 106, which communicates with a gateway GPRS support node (GGSN) 108 via a GPRS core network 110. Although only one of each of these entities is depicted in FIG. 1, it should be appreciated that any number of these entities may be supported. For example, multiple MSs 102 may connect to each BSS 104, and multiple BSSs 104 may connect to each SGSN 106. Further, multiple SGGNs 106 may interface with multiple GGSNs 108 via GPRS core network 110.

When a user wishes to access Internet 114 via MS 102, MS 102 sends a request message (known as an "Activate PDP Context" request) to SGSN 106 via BSS 104. In response to this request, SGSN 106 activates a session on behalf of the user and exchanges GPRS Tunneling Protocol (GTP) control packets (referred to as "GTP-C" packets) with GGSN 110 in order to signal session activation (as well as set/adjust certain session parameters, such as quality-of-service, etc.). The activated user session is associated with a tunnel between SGSN 106 and GGSN 108 that is identified by a unique tunnel endpoint identifier (TEID). In a scenario where MS 102 has roamed to BSS 104 from a different BSS served by a different SGSN, SGSN 106 may exchange GTP-C packets with GGSN 108 in order to update an existing session for the user (instead of activating a new session).

Once the user session has been activated/updated, MS 102 transmits user data packets (e.g., IPv4, IPv6, or Point-to-Point Protocol (PPP) packets) destined for an external host/network to BSS 104. The user data packets are encapsulated into GTP user, or "GTP-U," packets and sent to SGSN 106. SGSN 106 then tunnels, via the tunnel associated with the user session, the GTP-U packets to GGSN 108. Upon receiving the GTP-U packets, GGSN 108 strips the GTP header from the packets and routes them to Internet 114, thereby enabling the packets to be delivered to their intended destinations.

The architecture of a 4G/LTE network that makes uses of GPRS is similar in certain respects to 3G network 100 of FIG. 1. However, in a 4G/LTE network, BSS 104 is replaced by an eNode-B, SGSN 106 is replaced by a mobility management entity (MME) and a Serving Gateway (SGW), and GGSN 108 is replaced by a packet data network gateway (PGW).

For various reasons, an operator of a mobile network such as network 100 of FIG. 1 may be interested in analyzing traffic flows within the network. For instance, the operator may want to collect and analyze flow information for network management or business intelligence/reporting. Alternatively or in addition, the operator may want to monitor traffic flows in order to, e.g., detect and thwart malicious network attacks.

To facilitate these and other types of analyses, the operator can implement a network telemetry, or "visibility," system, such as system 200 shown in FIG. 2 according to an embodiment. At a high level, network visibility system 200 can intercept traffic flowing through one or more connected networks (in this case, GTP traffic between SGSN-GGSN pairs in a 3G network 206 and/or GTP traffic between eNodeB/MME-SGW pairs in a 4G/LTE network 208) and can intelligently distribute the intercepted traffic among a number of analytic servers 210(1)-(M). Analytic servers 210(1)-(M), which may be operated by the same operator/service provider as networks 206 and 208, can then analyze the received traffic for various purposes, such as network management, reporting, security, etc.

In the example of FIG. 2, network visibility system 200 comprises two components: a GTP Visibility Router (GVR) 202 and a GTP Correlation Cluster (GCC) 204. GVR 202 can be considered the data plane component of network visibility system 200 and is generally responsible for receiving and forwarding intercepted traffic (e.g., GTP traffic tapped from 3G network 206 and/or 4G/LTE network 208) to analytic servers 210(1)-(M).

GCC 204 can be considered the control plane of network visibility system 200 and is generally responsible for determining forwarding rules on behalf of GVR 202. Once these forwarding rules have been determined, GCC 204 can program the rules into GVR 202's forwarding tables (e.g., content-addressable memories, or CAMs) so that GVR 202 can forward network traffic to analytic servers 210(1)-(M) according to customer (e.g., network operator) requirements. As one example, GCC 204 can identify and correlate GTP-U packets that belong to the same user session but include different source (e.g., SGSN) IP addresses. Such a situation may occur if, e.g., a mobile user starts a phone call in one wireless access area serviced by one SGSN and then roams, during the same phone call, to a different wireless access area serviced by a different SGSN. GCC 204 can then create and program forwarding rules in GVR 202 that ensure these packets (which correspond to the same user session) are all forwarded to the same analytic server for consolidated analysis.

Additional details regarding an exemplary implementation of network visibility system 200, as well as the GTP correlation processing attributed to GCC 204, can be found in commonly-owned U.S. patent application Ser. No. 14/603,304, entitled "SESSION-BASED PACKET ROUTING FOR FACILITATING ANALYTICS," the entire contents of which are incorporated herein by reference for all purposes.

In order for GVR 202 and GCC 204 to interoperate as intended, in certain embodiments they may need to exchange control and configuration information at the time of being powered-on, and potentially also during runtime. Accordingly, it would be desirable to have techniques that support this information exchange in a structured manner.

SUMMARY

Techniques for exchanging control and configuration information in a network visibility system are provided. In one embodiment, a control plane component of the network visibility system can receive one or more first messages from a data plane component of the network visibility system, where the one or more first messages define one or more forwarding resources available on the data plane component. Examples of such forwarding resources include ingress ports, egress ports, and/or services instances that have been configured on the data plane component. The control plane component can further retrieve configuration information stored on the control plane component that comprises one or more network prefixes to be monitored by the network visibility system, and can determine one or more mappings between the network prefixes and the forwarding resources. Upon determining the one or more mappings, the control plane component can generate one or more packet forwarding rules based on the mappings. Finally, the control plane component can transmit one or more second messages to the data plane component that include the packet forwarding rules for programming on the data plane component, thereby enabling the data plane component to forward incoming traffic (e.g., traffic intercepted from one or more connected networks) in accordance with the rules.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Figure 1:
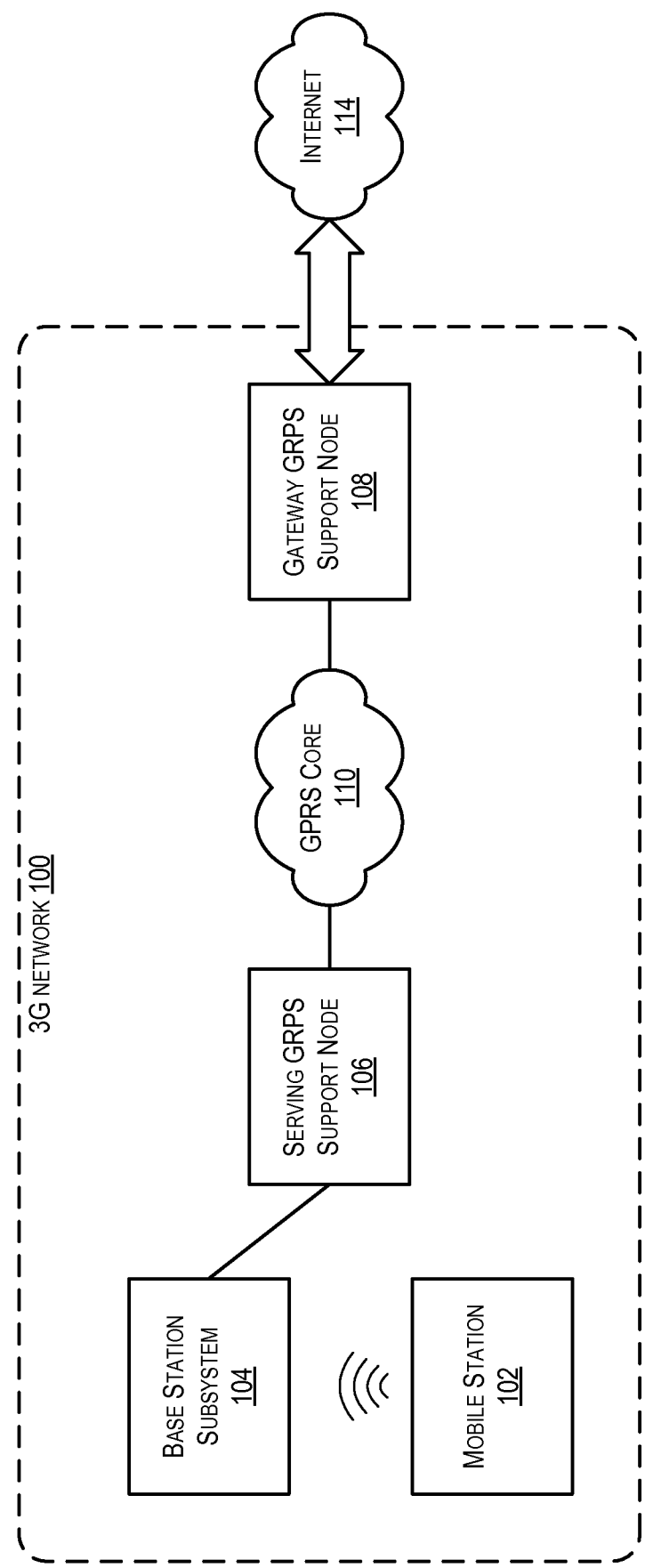
FIG. 1 depicts an exemplary 3G network.
Figure 2:
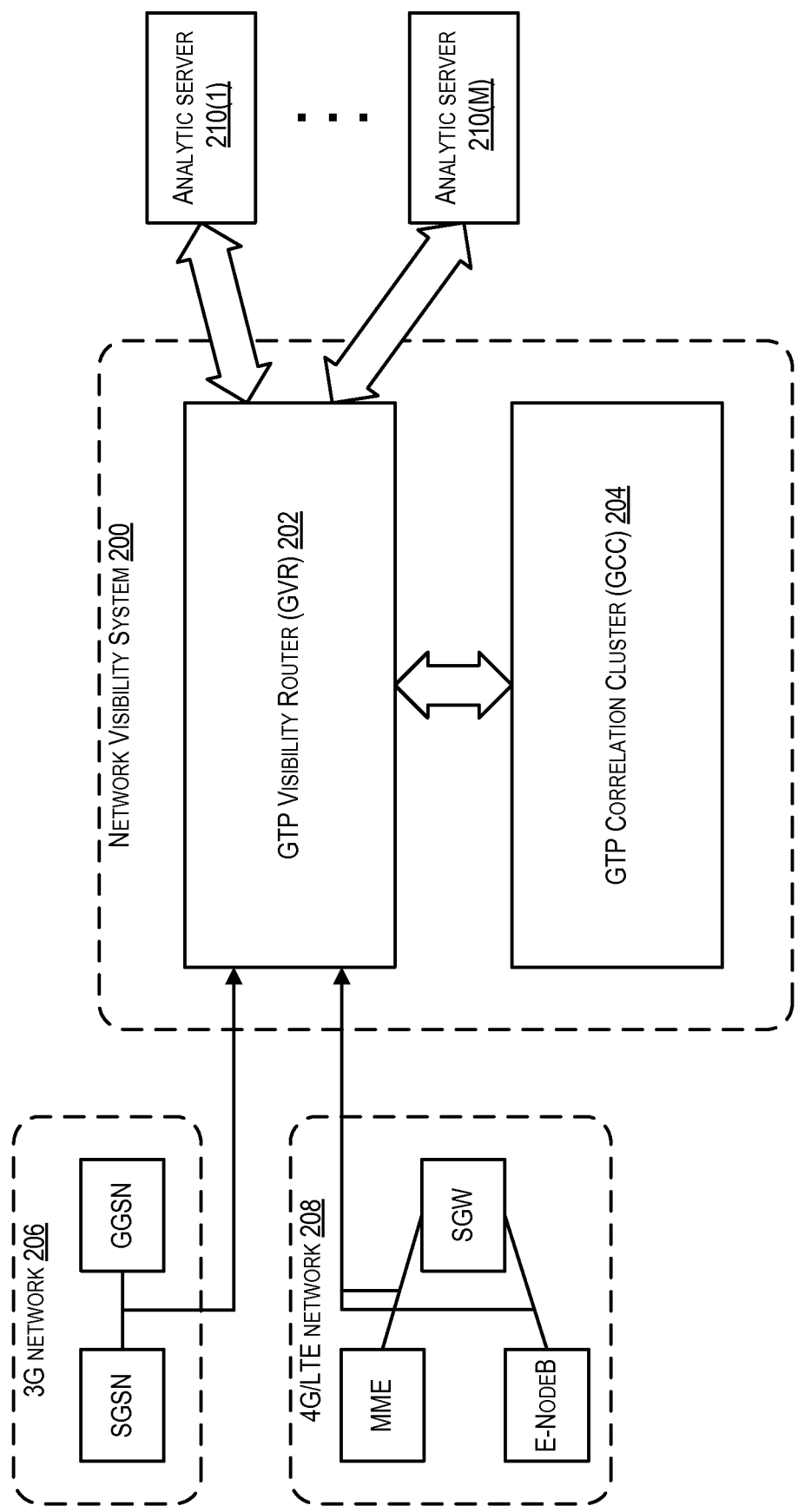
FIG. 2 depicts a network visibility system according to an embodiment.

Embodiments of the present disclosure provide techniques for exchanging control and configuration information between a data plane component (e.g., GVR 202 of FIG. 2) and a control plane component (e.g., GCC 204 of FIG. 2) of a network visibility system. With these techniques, the control plane component can be made aware of the forwarding resources that are available (i.e., have been configured) on the data plane component, such as ingress ports, egress ports, and service instances (i.e., processing elements responsible for packet forwarding). The control plane component can then formulate an initial set of packet forwarding rules based on the available forwarding resources (as well as local configuration information), and can send the packet forwarding rules to the data plane component for programming. In this way, the data plane component can be properly initialized for forwarding incoming traffic from connected network(s) (e.g., 3G and 4G/LTE networks 206 and 208) to one or more analytic servers (e.g., servers 210(1)-(M)). In embodiments where the network visibility system supports multiple different types of forwarding rules (e.g., "default" rules, "zoning" rules, "whitelisting" rules, and "Gi" rules, which are described in detail below), the control plane component can send the rules corresponding to each rule type as a separate message (or series of messages), with an appropriate rule identifier so that the data plane component knows how to process each rule message.

In certain embodiments, after the control plane component has sent an initial set of forwarding rules to the data plane component as discussed above, the configuration of the forwarding resources on the data plane component may change. For example, additional ingress or egress ports may be configured/provisioned, certain ports may be disabled or may fail, etc. In this case, the data plane component can automatically send one or more update messages to the control plane component with information regarding the modified forwarding resources. In response, the control plane component can generate updated packet forwarding rules and transmit those updated rules for programming on the data plane component. Alternatively, in certain embodiments, the local configuration information that is used by the control plane component to generate the packet forwarding rules may change. In this case, the control plane component can automatically determine and send updated packet forwarding rules (in view of the modified local configuration information) to the data plane component.

The foregoing and other aspects of the present disclosure are described in greater detail in the sections that follow.

2. High-Level Workflow

Figure 3A:
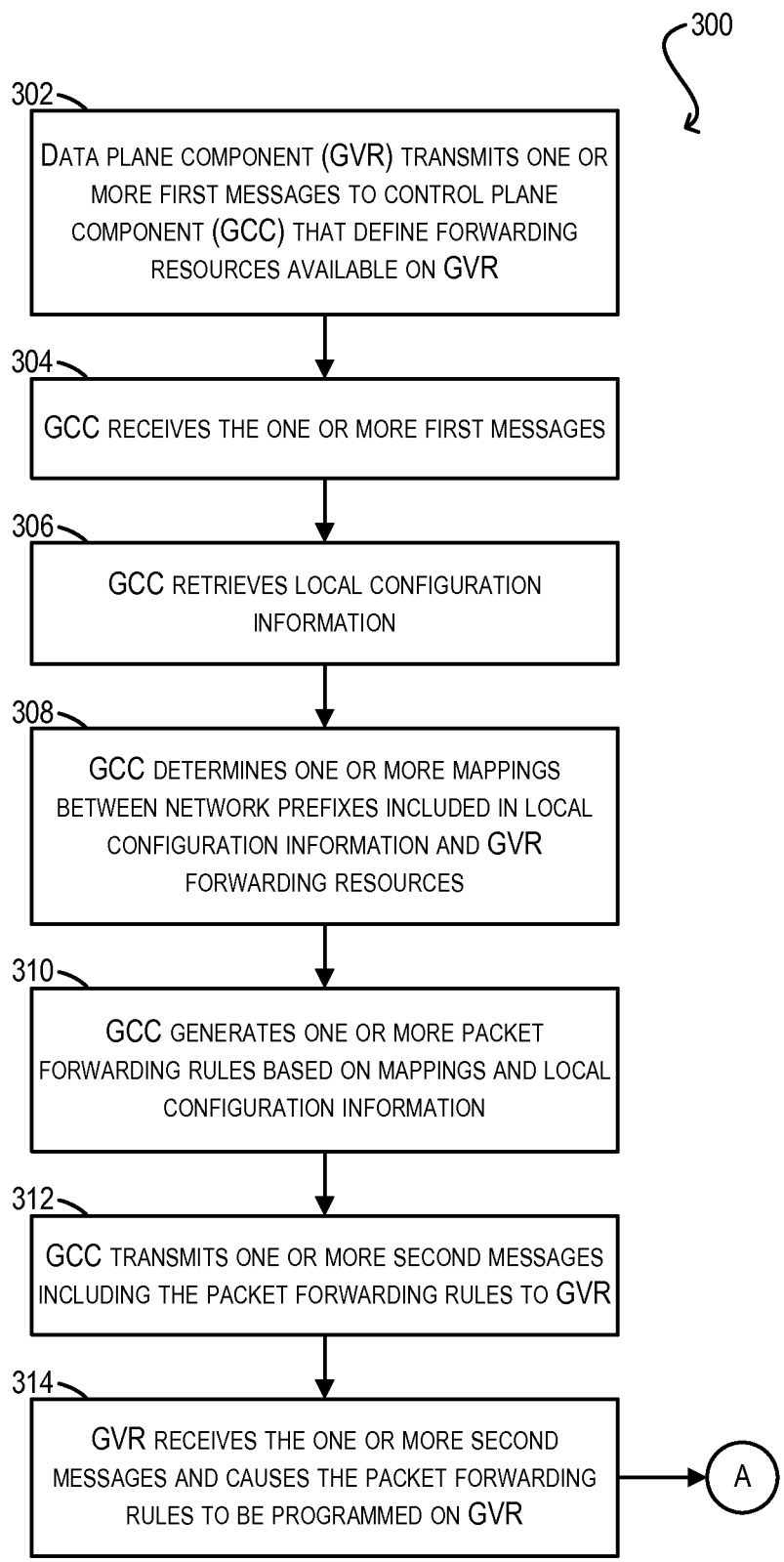
FIGS. 3A and 3B depict a high-level workflow for exchanging control and configuration information between a data plane component (e.g., GVR) and control plane component (e.g., GCC) of a network visibility system according to an embodiment.
Figure 3B:
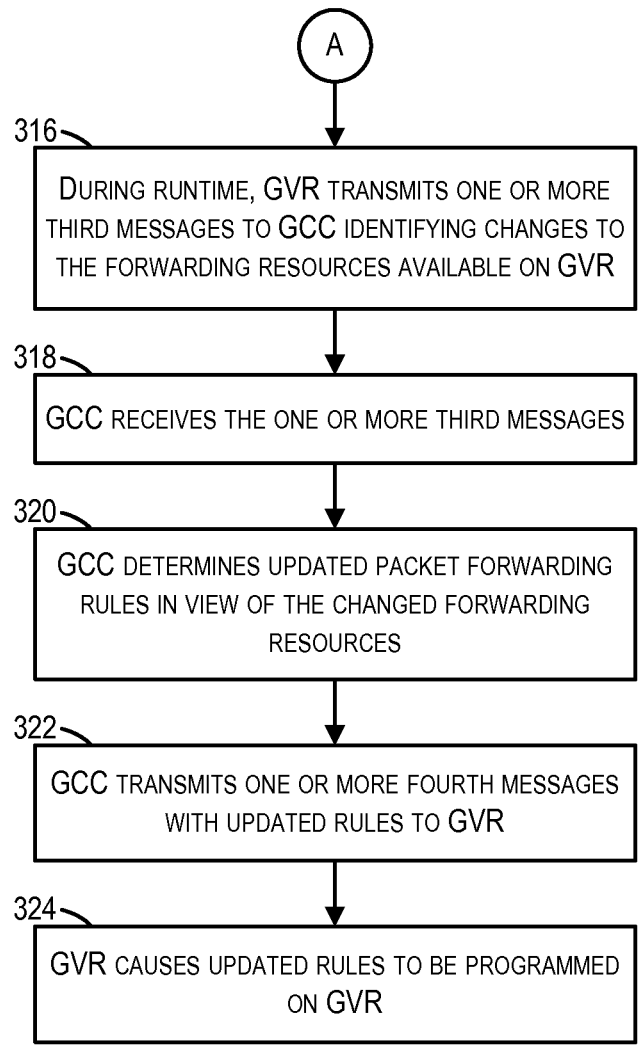

FIGS. 3A and 3B depict a high-level workflow 300 that can be executed by the data plane component of network visibility system 200 (i.e., GVR 202) and the control plane component of network visibility system 200 (i.e., GCC 204) for exchanging control and configuration information according to an embodiment. It is assumed that workflow 300 is initiated when GVR 202 and GCC 204 are first booted-up and/or initialized.

Starting with block 302 of FIG. 3A, the data plane component (GVR 202) can transmit one or more first messages to the control plane component (GCC 204) that define the forwarding resources that are available on GVR 202. In one embodiment, the one or more first messages can include port IDs for ingress ports that have been configured on GVR 202 (and which connect GVR 202 to one or more networks to be monitored, such as 3G and 4G/LTE networks 206 and 208). In a further embodiment, the one or more first messages can include port IDs for egress ports that have been configured on GVR 202 (and which connect GVR 202 to one or more analytic servers, such as servers 210(1)-(M)). In yet a further embodiment, the one or more first messages can include information regarding service instances (i.e., packet processing elements) that have been configured on GVR 202. For example, if GVR 202 is implemented using a physical network switch/router, these service instances can corresponding to packet processors, or line cards comprising packet processors, that perform the task of forwarding incoming packets to appropriate egress ports (and thus, to analytic servers 210(1)-(M)) at line rate. Each such service instance can have one or more forwarding tables (e.g., CAMs) that are adapted to hold packet forwarding rules identifying how packets should be forwarded by that service instance.

At blocks 304 and 306, GCC 204 can receive the one or more first messages sent by GVR 202 and can retrieve local configuration information that is stored on GCC 204 (or a storage component accessible to GCC 204). This local configuration information can include information that is usable by GCC 204 for generating, in conjunction with the forwarding resource information received from GVR 202, an initial set of packet forwarding rules to be programmed on GVR 202. For example, in one embodiment, the local configuration information can include a set of network prefixes that is preconfigured by, e.g., an administrator of network visibility system 200 and that identifies IP address ranges of network elements (e.g., GGSNs or SGWs) to be monitored by system 200. In other embodiments, the local configuration information can also include other types of information, such as user-defined packet tags (referred to as "zones"), user-defined whitelist addresses, and so on and that may be used to generate certain alternative types of forwarding rules that are supported by GVR 202.

At block 308, GCC 204 can determine one or more mappings between the network prefixes included in the local configuration information retrieved at block 306 and the GVR forwarding resources identified in the messages received at block 304. In particular, GCC 204 can map each network prefix to a particular egress port and service instance of GVR 202. In this way, GCC 204 can define how traffic destined for a network element (e.g., GGSN or SGW) within that network prefix range should be forwarded (via the mapped egress port) and which packet processing element on GVR 202 should handling the forwarding operation (via the mapped service instance). GCC 204 can create these mappings using any of a number of algorithms, such as round-robin matching of network prefixes to the available egress ports and service instances on GVR 202.

Then, at block 310, GCC 204 can generate packet forwarding rules for programming on GVR 202 based on the mappings determined at block 308. As indicated above, these packet forwarding rules can include "default" rules that identify, for each network prefix, which egress port will initially serve as the outgoing interface for traffic destined for that prefix, and which service instance in GVR 202 will handle the forwarding operation. The packet forwarding rules generated at block 310 can also include other types of forwarding rules based on the content of the local configuration information stored on GCC 204, such as zoning rules, whitelisting rules, and more (discussed in greater detail below).

Upon generating the packet forwarding rules, GCC 204 can send the rules via one or more second messages to GVR 202 (block 312). In scenarios where GCC 204 has generated multiple different types of packet forwarding rules, GCC 204 can transmit each type of forwarding rule as a separate message, with a rule identifier that identifies the rule type (e.g., default rule, zoning rule, whitelisting rule, etc.).

Then, at block 314, GVR 202 can receive the one or more second messages from GCC 204 and can cause the packet forwarding rules included in the messages to be programmed (i.e., installed) in appropriate forwarding tables (e.g., CAMs) on GVR 202. In this way, GVR 202 can be initialized to forward incoming traffic in accordance with those rules. Recall that certain packet forwarding rules may be associated with a service instance on GVR 202 that is responsible for handling the forwarding operation. In these cases, GVR 202 may install those rules in the forwarding tables of the associated service instances.

Turing now to FIG. 3B, at some point during GVR 202's runtime operation, the availability of the forwarding resources on GVR 202 may change. For example, the administrator may provision additional ingress or egress ports, or may disable certain ports/service instances. Accordingly, at block 316, GVR 202 can send one or more third messages to GCC 204 identifying those forwarding resource changes.

At blocks 318 and 320, GCC 204 can receive the messages sent at block 316 and can determine whether any of the packet forwarding rules that were previously determined and sent to GVR 202 need to modified/updated. If so, GCC 204 can send one or more fourth messages to GVR 202 with the updated rules (block 322). Finally, at block 324, GVR 204 can cause the updated rules to be programmed into the appropriate forwarding tables, thereby bringing its configuration in sync with GCC 204.

It should be noted that the steps shown in FIG. 3B can be repeated each time there is a configuration change on GVR 202. Further, although not explicitly shown, GCC 204 can monitor its local configuration information for any changes that may necessitate a rule modification/update. If any such changes are detected, GCC 204 can automatically send those updated rules to GVR 202 per block 322.

Figure 4:
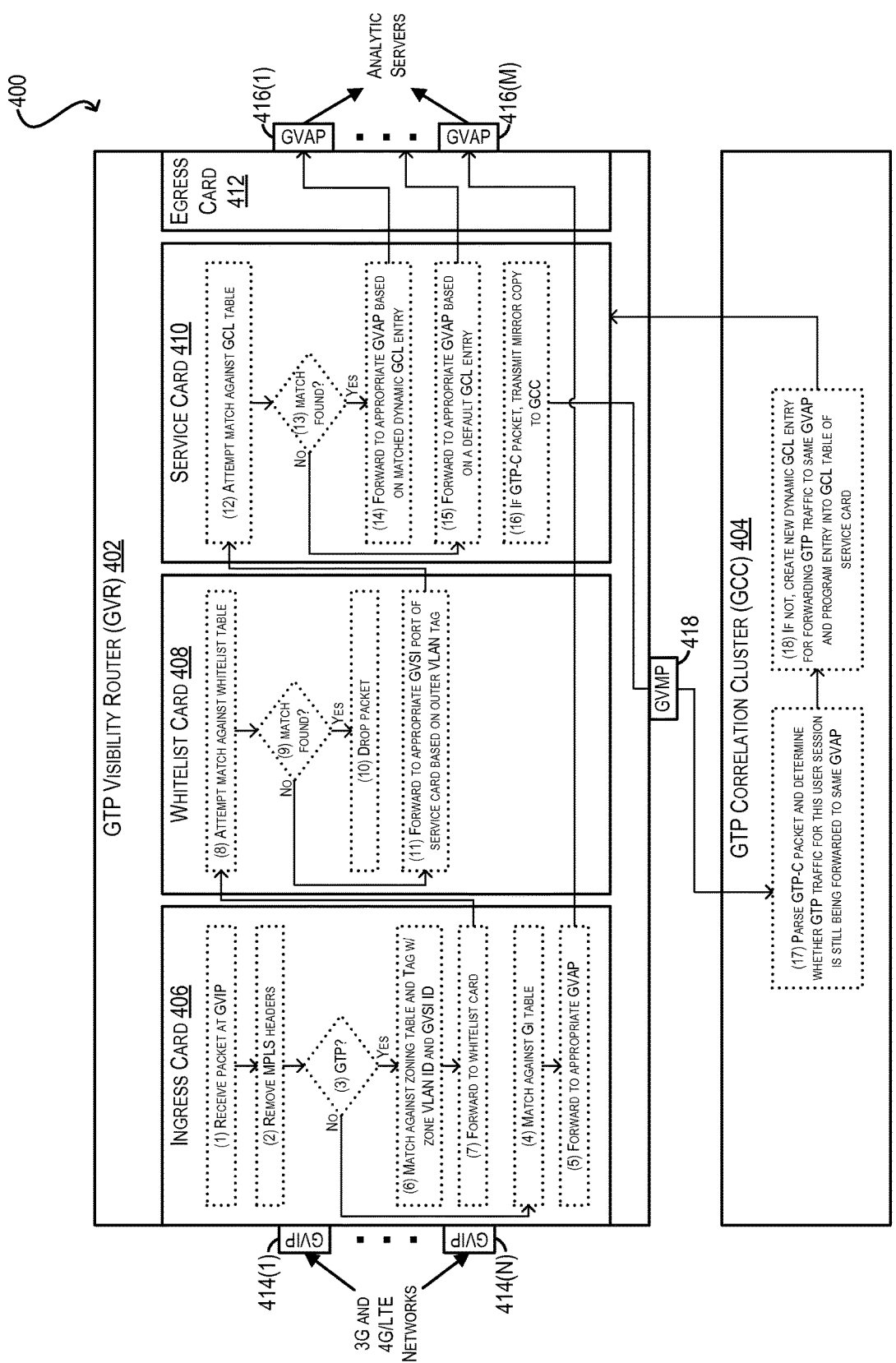
FIG. 4 depicts an architecture and runtime workflow for a specific network visibility system implementation according to an embodiment.

3. Exchange of Control and Configuration Information in a Specific Network Visibility System Implementation The high-level workflow of FIGS. 3A and 3B provide a general framework for exchanging control and configuration information in a network visibility system that comprises GVR and GCC components. However, the particular types of forwarding resource information that are passed from the GVR to the GCC, as well as the particular types of packet forwarding rules that are generated by the GCC and passed to the GVR, may vary depending on the features and architectural details implemented by these components. FIG. 4 depicts a specific implementation of a network visibility system (400) that is configured to intelligently distribute GTP traffic originating from mobile (e.g., 3G and/or 4G/LTE) networks to one or more analytic servers, as well as a runtime workflow that may be performed within system 400 according to an embodiment. The operation of network visibility system 400 is explained below. The subsequent figures and subsections then describe a control/configuration information exchange between the data plane and control plane components of system 400 (i.e., GVR 402 and GCC 404) that takes into account the architectural details/design of the system.

3.1 System Architecture and Runtime Workflow

As shown in FIG. 4, GVR 402 of network visibility system 400 includes an ingress card 406, a whitelist card 408, a service card 410, and an egress card 412. In a particular embodiment, each card 406-412 represents a separate line card or module in GVR 402. Ingress card 406 comprises a number of ingress (i.e., "GVIP") ports 414(1)-(N), which are communicatively coupled with one or more 3G and/or 4G/LTE mobile networks (e.g., networks 206 and 208 of FIG. 2). Further, egress card 412 comprises a number of egress (i.e., "GVAP") ports 416(1)-(M), which are communicatively coupled with one or more analytic servers (e.g., servers 210(1)-(M) of FIG. 2). Although only a single instance of ingress card 406, whitelist card 408, service card 410, and egress card 412 are shown, it should be appreciated that any number of these cards may be supported.

In operation, GVR 402 can receive an intercepted (i.e., tapped) network packet from 3G network 206 or 4G/LTE network 208 via a GVIP port 414 of ingress card 406 (step (1)). At steps (2) and (3), ingress card 406 can remove the received packet's MPLS headers and determine whether the packet is a GTP packet (i.e., a GTP-C or GTP-U packet) or not. If the packet is not a GTP packet, ingress card 406 can match the packet against a "Gi" table that contains forwarding rules (i.e., entries) for non-GTP traffic (step (4)). Based on the Gi table, ingress card 406 can forward the packet to an appropriate GVAP port 416 for transmission to an analytic server (e.g., an analytic server that has been specifically designated to process non-GTP traffic) (step (5)).

On the other hand, if the packet is a GTP packet, ingress card 406 can match the packet against a "zoning" table and can tag the packet with a zone VLAN ID (as specified in the matched zoning entry) as its inner VLAN tag and a service instance ID (also referred to as a "GVSI ID") as its outer VLAN tag (step (6)). In one embodiment, the zone VLAN ID is dependent upon: (1) the ingress port (GVIP) on which the packet is received, and (2) the IP address range of the GGSN associated with the packet in the case of a 3G network, or the IP address range of the SGW associated with the packet in the case of a 4G/LTE network. Thus, the zone tag enables the analytic servers to classify GTP packets based on this [GVIP, GGSN/SGW IP address range] combination. In certain embodiments, the GTP traffic belonging to each zone may be mapped to two different zone VLAN IDs depending whether the traffic is upstream (i.e., to GGSN/SGW) or downstream (i.e., from GGSN/SGW) traffic. Once tagged, the GTP packet can be forwarded to whitelist card 408 (step (7)).

At steps (8) and (9), whitelist card 408 can attempt to match the inner IP addresses (e.g., source and/or destination IP addresses) of the GTP packet against a "whitelist" table. The whitelist table, which may be defined by a customer, comprises entries identifying certain types of GTP traffic that the customer does not want to be sent to analytic servers 210(1)-(M) for processing. For example, the customer may consider such traffic to be innocuous or irrelevant to the analyses performed by analytic servers 210. If a match is made at step (9), then the GTP packet is immediately dropped (step (10)). Otherwise, the GTP is forwarded to an appropriate service instance port (GVSI port) of service card 410 based on the packet's GVSI ID in the outer VLAN tag (step (11)). Generally speaking, service card 410 can host one or more service instances, each of which corresponds to a separate GVSI port and is responsible for processing some subset of the incoming GTP traffic from 3G network 206 and 4G/LTE network 208 (based on, e.g., GGSN/SGW). In a particular embodiment, service card 410 can host a separate service instance (and GVSI port) for each packet processor implemented on service card 410.

At steps (12) and (13), service card 410 can receive the GTP packet on the GVSI port and can attempt to match the packet against a "GCL" table defined for the service instance. The GCL table can include forwarding entries that have been dynamically created by GCC 404 for ensuring that GTP packets belonging to the same user session are all forwarded to the same analytic server (this is the correlation concept described in the Background section). The GCL table can also include default forwarding entries. If a match is made at step (13) with a dynamic GCL entry, service card 410 can forward the GTP packet to a GVAP port 416 based on the dynamic entry (step (14)). On the other hand, if no match is made with a dynamic entry, service card 410 can forward the GTP packet to a GVAP port 416 based on a default GCL entry (step (15)). For example, the default rule or entry may specify that the packet should be forwarded to a GVAP port that is statically mapped to a GGSN or SGW IP address associated with the packet.

In addition to performing the GCL matching at step (13), service card 410 can also determine whether the GTP packet is a GTP-C packet and, if so, can transmit a copy of the packet to GCC 404 (step (16)). Alternatively, this transmission can be performed by whitelist card 408 (instead of service card 410). In a particular embodiment, the copy of the GTP-C packet can be sent via a separate mirror port, or "GVMP," 418 that is configured on GVR 402 and connected to GCC 404. Upon receiving the copy of the GTP-C packet, GCC 404 can parse the packet and determine whether GTP traffic for the user session associated with the current GTP-C packet will still be sent to the same GVAP port as previous GTP traffic for the same session (step (17)). As mentioned previously, in cases where a user roams, the SSGN source address for GTP packets in a user session may change, potentially leading to a bifurcation of that traffic to two or more GVAP ports (and thus, two or more different analytic servers). If the GVAP port has changed, GCC 404 can determine a new dynamic GCL entry that ensures all of the GTP traffic for the current user session is sent to the original GVAP port. GCC 404 can then cause this new dynamic GCL entry to be programmed into the dynamic GCL table of service card 410 (step (18)). Thus, all subsequent GTP traffic for the same user session will be forwarded based on this new entry at steps (12)-(14).

3.2 Control and Configuration Information Exchange State Diagram

Figure 5:
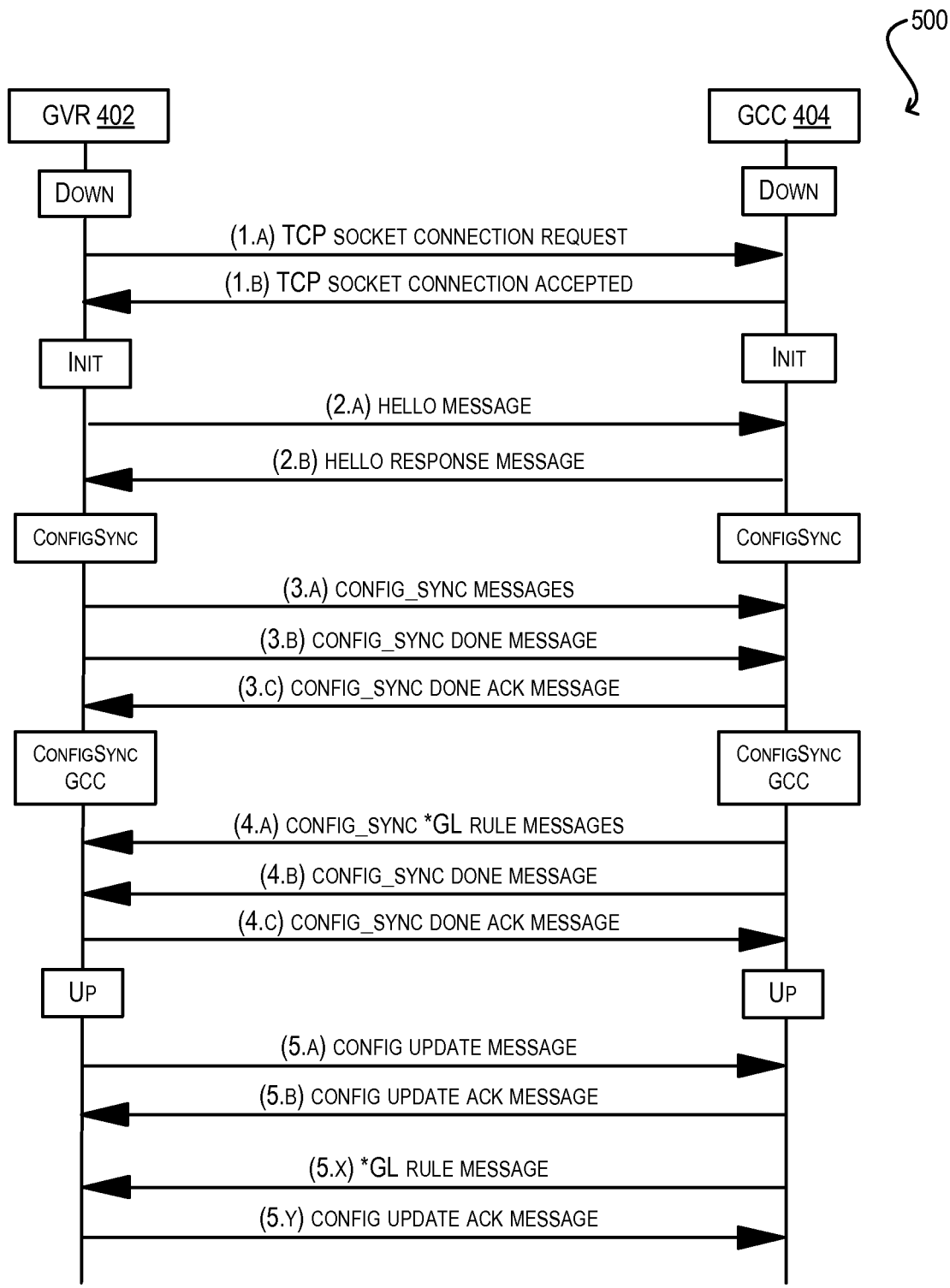
FIG. 5 depicts a state diagram for exchanging control and configuration information within the network visibility system of FIG. 4 according to an embodiment.

With the system architecture and runtime workflow of FIG. 4 in mind, FIG. 5 depicts a state diagram 500 for exchanging control and configuration information between GVR 402 and GCC 404 of network visibility system 400 according to an embodiment. State diagram 500 generally follows the framework of high-level workflow 300 of FIGS. 3A and 3B, but involves the exchange of configuration information and packet forwarding rules that are specific to the design of GVR 402 and GCC 404. In addition, state diagram 500 of FIG. 5 is based on a state-based paradigm that ensures each endpoint of the communication exchange (i.e., GVR 402 and GCC 404) has completed requisite steps before moving on to a successive stage of the exchange. As part of this state-based workflow, error-handling routines are implemented to address lost/delayed messages, as well as failures on either the GVR or GCC side. In this way, state diagram 500 can avoid scenarios where GVR 402 has transitioned into an "up" state (and thus is ready to begin runtime operation) while GCC 404 has not, or vice versa.

In the embodiment of FIG. 5, it is assumed that TCP/IP is used as the underlying network protocol for the communication exchange, where GCC 404 is the TCP server (using, e.g., TCP port 9973) and GVR 402 is the TCP client (using, e.g., TCP port 9972). In other embodiments, other types of network protocols, such as UDP, can be used.

As shown in FIG. 5, GVR 402 and GCC 404 both start off in a "Down" state. At step (1.*a*), GVR 402 can send a TCP socket connection request to GCC 404. In response, GCC 404 can return an "accepted" message to GVR 402 and both GCC 404 and GVR 402 can transition to an "Init" state (step (1.*b*)). If the request is not accepted or otherwise fails, GVR 402 can retry the request after a predefined period of time (e.g., 30 seconds).

In the Init state, GVR 402 can send a hello message to GCC 404 (step (2.*a*)). If GCC 404 receives the hello message and is ready to operate, GCC 404 can respond back with a hello response and both components can transition to a "ConfigSync" state (step (2.*b*)). If GVR 402 does not receive a hello response from GCC 404 within a predefined period of time (e.g., 1 second), GVR 402 can resend the hello message. If GVR 402 sends a predefined number of hello messages (e.g., 3 messages) and still does not receive a response, GVR 402 can conclude that GCC 404 is failed or unavailable, tear down the TCP connection, and return to the Down state.

In the ConfigSync state, GVR 402 can send one or more config_sync messages to GCC 402 that include information regarding the GVR's currently available forwarding resources (step (3.*a*)). This information can include:
  port IDs for ingress ports (GVIPs);
  port IDs for egress ports (GVAPs), as well as the ranges of GVAP ports that are designated for 3G and 4G/LTE traffic respectively;
  service instance information, which can comprise service IDs for the GVSIs configured on service card 410, connection attributes for each GVSI (e.g., UDP port and GVSI port), and GCL table address ranges (i.e., CAM indexes) for each GVSI that may be used to program dynamic GCL entries; and
  port ID(s) for whitelist card 408.

Once all config_sync messages have been sent to GCC 404, GVR 402 can send a config_sync_done message to GCC 404 (step (3.*b*)).

Upon receiving the config_sync_done message, if GCC 404 has received and finished processing all of the configuration messages, GCC 404 can respond back with a config_sync_done acknowledgement message to GVR 402 and transition to a "ConfigSyncGCC" state (step (3.*c*)). Similarly, upon receiving the config_sync_done ack message, GVR 402 can transition to the ConfigSyncGCC state. If GVR 402 does not receive the config_sync_done ack message from GCC 404 within a predefined period of time (e.g., 30 seconds), GVR 402 can conclude that GCC 404 is failed or unavailable, tear down the TCP connection, and return to the down state.

In the ConfigSyncGCC state, GCC 404 retrieve local configuration information that includes, e.g., GGSN and/or SGW prefixes to be monitored by network visibility system 400, zone IDs for one or more of the GGSN/SGW prefixes, whitelist addresses, and Gi entries for forwarding non-GTP traffic. GCC 404 can then determine mappings between the GGSN/SGW prefixes and the forwarding resources received from GVR 402 (i.e., GVAP ports and service instances), and generate packet forwarding rules based on the mappings. In one embodiment, these packet forwarding rules can include:
  a zoning access control list (ACL) that can be used by GVR 402 to populate its zoning table and thereby tag incoming GTP traffic with the specific zone IDs defined in the local configuration information, as described with respect to step (6) of FIG. 4;
  a default GCL ACL that can be used by GVR 402 to populate its GCL table(s) with default forwarding entries, which are used to forward incoming GTP traffic to particular analytic servers 210 if there are no dynamic entries, as described with respect to step (14) of FIG. 4;
  a whitelist ACL that can be used by GVR 402 to populate its whitelist table and thereby filter out certain types of incoming GTP traffic, such that the filtered traffic is dropped immediately (rather than being forwarded to the analytic servers), as described with respect to step (8) of FIG. 4; and
  a Gi ACL that can be used by GVR 402 to populate its Gi table and thereby forward non-GTP traffic to a particular analytic server 210, as described with respect to steps (4) and (5) of FIG. 4.

At step (4.*a*), GVR 402 can send rule configuration messages that include the generated packet forwarding rules to GVR 402. Once all of the messages have been sent, GCC 404 can send a config_sync_done message to the GVR (step (4.*b*)).

Upon receiving the config_sync_done message, GVR 402 can cause the forwarding rules included in the configuration messages to be programmed into appropriate hardware forwarding tables on GVR 402 (e.g., the Gi table, zoning table, whitelist table, and GCL table). Once GVR 402 has finished processing all of these configuration messages, GVR 402 can respond back with a config_sync_done acknowledgement message to GCC 404 and transition to a "Up" state (step (4.*c*)). Similarly, upon receiving the config_sync_done ack message, GCC 104 can transition to the Up state.

If the GVR does not receive the config_sync_done message from the GCC within a predefined period of time (e.g., 10 minutes), the GCC can conclude that the GVR is failed or unavailable, tear down the TCP connection, and return to the down state.

In the Up state, GVR 402 and GCC 404 can perform their respective runtime functions (e.g., GVR 402 can receive and forward GTP traffic to analytic servers 210(1)-(M), and GCC 404 can receive and process mirrored GTP-C traffic from GVR 402) as described with respect to FIG. 4. If there are any modifications to GVR 402 while in this Up state (e.g., GVSI, GVAP, or GVIP changes), GVR 402 can send a configuration update message to GCC 404 identifying the changes (step (5.*a*.)). Upon receiving this message, GCC 404 can return a configuration update acknowledgement message to GVR 402 (step (5.*b*)).

Similarly, if there are any modifications to the forwarding rules on GCC 404 while in the Up state (e.g., zoning ACL, default GCL, whitelist ACL, or Gi ACL changes), GCC 404 can send a configuration update message to GVR 402 identifying the changes (step (5.*x*)). Upon receiving this message, GVR 402 can return a configuration update acknowledgement message to GCC 404 (step (5.*y*)).

If the GVR/GCC does not receive the configuration update acknowledgement message back from the GCC/GVR within a predefined period of time (e.g., 1 second), the GVR/GCC can resend the configuration update message. If the GVR/GCC sends a predefined number of configuration update messages (e.g., 3 messages) and still does not receive a response, the GVR/GCC can conclude that the GCC is failed or unavailable, tear down the TCP connection, and return to the down state.

4. Network Switch

Figure 6:
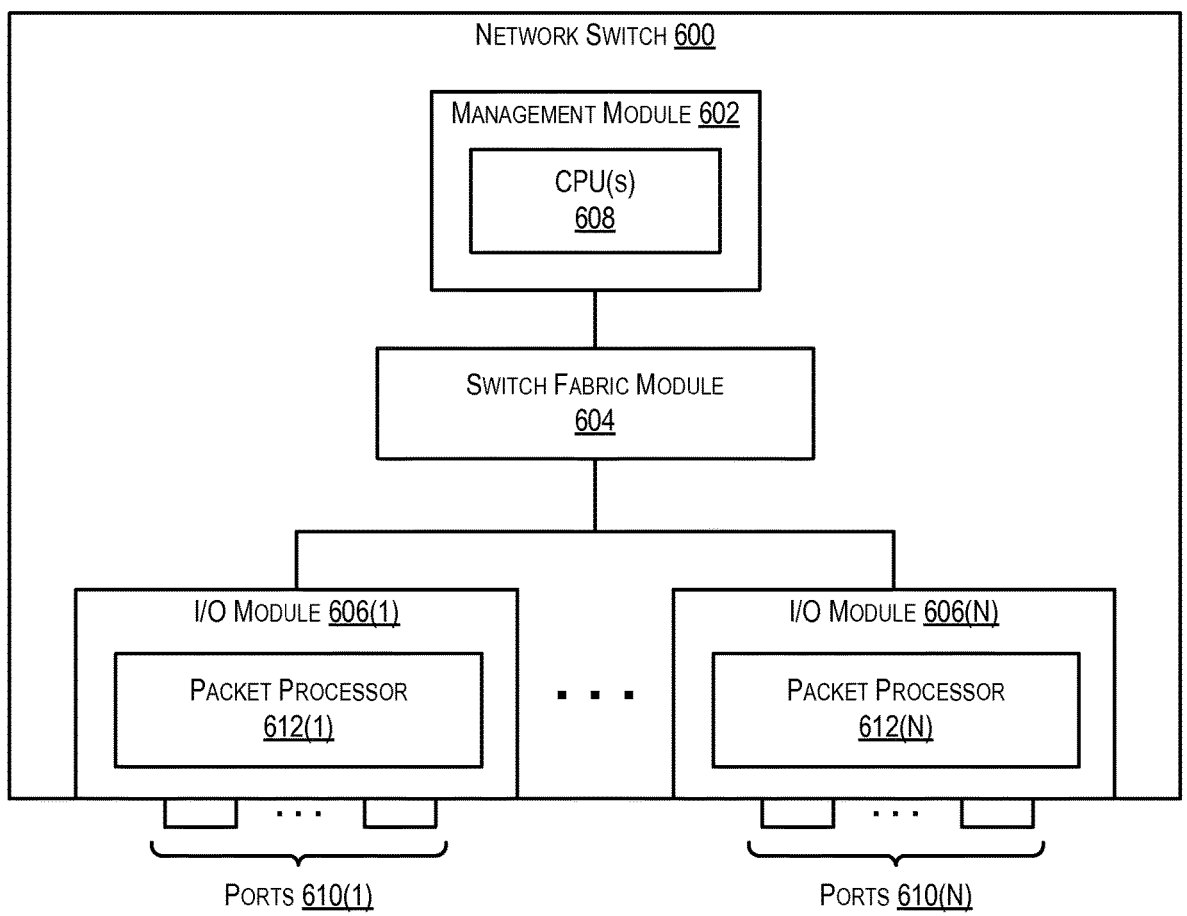
FIG. 6 depicts a network switch/router according to an embodiment.

FIG. 6 depicts an exemplary network switch 600 according to an embodiment. Network switch 600 can be used to implement, e.g., GVR 202/402 of FIGS. 2 and 4.

As shown, network switch 600 includes a management module 602, a switch fabric module 604, and a number of I/O modules (i.e., line cards) 606(1)-606(N). Management module 602 includes one or more management CPUs 608 for managing/controlling the operation of the device. Each management CPU 608 can be a general purpose processor, such as a PowerPC, Intel, AMD, or ARM-based processor, that operates under the control of software stored in an associated memory (not shown).

Switch fabric module 404 and I/O modules 606(1)-606(N) collectively represent the data, or forwarding, plane of network switch 600. Switch fabric module 604 is configured to interconnect the various other modules of network switch 600. Each I/O module 606(1)-606(N) can include one or more input/output ports 610(1)-610(N) that are used by network switch 600 to send and receive data packets. Each I/O module 606(1)-606(N) can also include a packet processor 612(1)-612(N). Packet processor 612(1)-612(N) is a hardware processing component (e.g., an FPGA or ASIC) that can make wire speed decisions on how to handle incoming or outgoing data packets. In a particular embodiment, I/O modules 606(1)-606(N) can be used to implement the various types of cards described with respect to GVR 402 in FIG. 4 (e.g., ingress card 406, whitelist card 408, service card 410, and egress card 412).

It should be appreciated that network switch 600 is illustrative and not intended to limit embodiments of the present invention. Many other configurations having more or fewer components than switch 600 are possible.

5. Computer System

Figure 7:
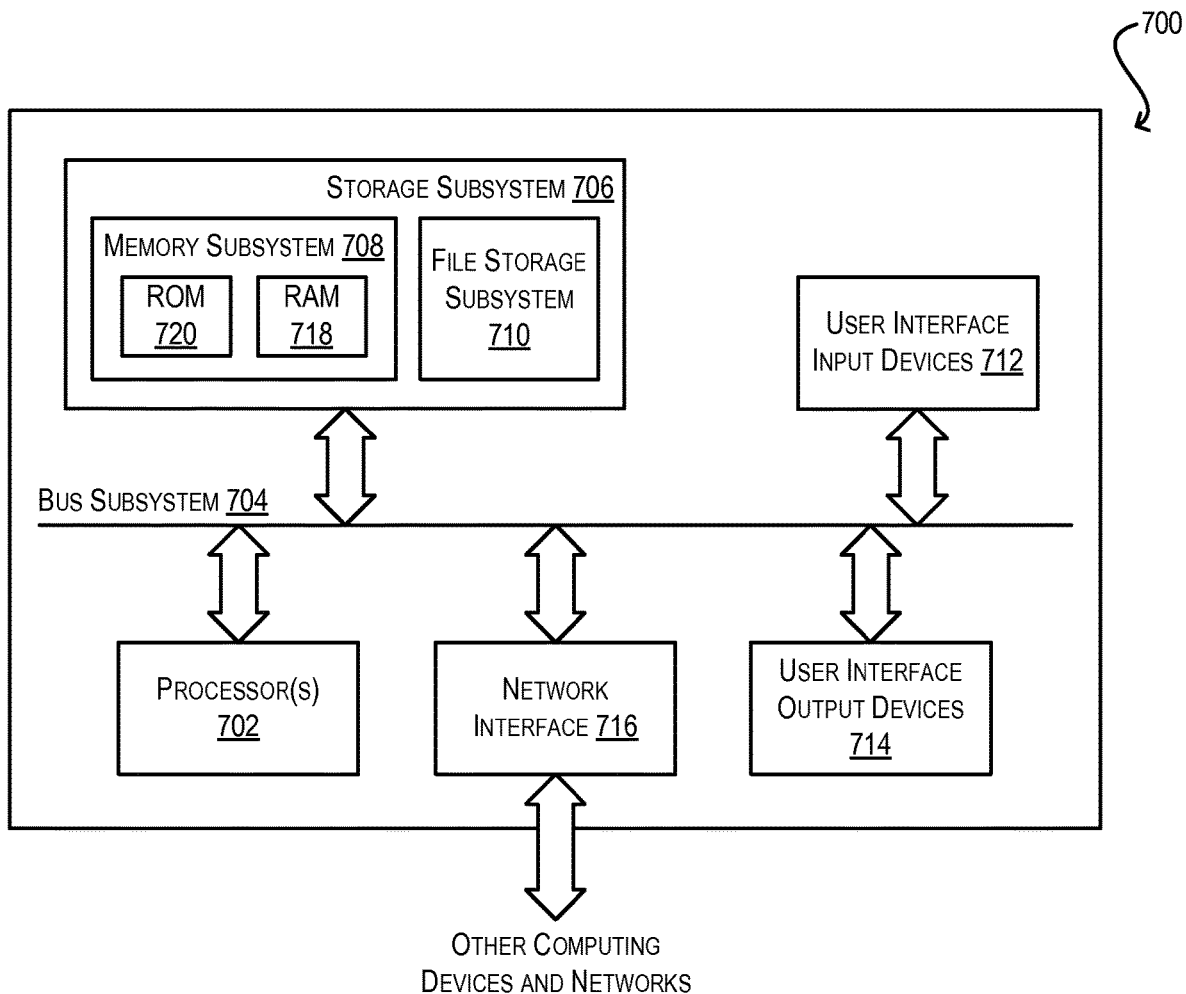
FIG. 7 depicts a computer system according to an embodiment.

FIG. 7 is a simplified block diagram of a computer system 700 according to an embodiment. Computer system 700 can be used to implement, e.g., GCC 204/404 of FIGS. 2 and 4. As shown in FIG. 7, computer system 700 can include one or more processors 702 that communicate with a number of peripheral devices via a bus subsystem 704. These peripheral devices can include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computing devices or networks. Embodiments of network interface subsystem 716 can include wired (e.g., coaxial, twisted pair, or fiber optic Ethernet) and/or wireless (e.g., Wi-Fi, cellular, Bluetooth, etc.) interfaces.

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 can include a memory subsystem 708 and a file/disk storage subsystem 710. Subsystems 708 and 710 represent non-transitory computer-readable storage media that can store program code and/or data that provide the functionality of various embodiments described herein.

Memory subsystem 708 can include a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and not intended to limit embodiments of the present invention. Many other configurations having more or fewer components than computer system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although GVR 202/402 and GCC 204/404 have generally been described as separate and distinct devices in network visibility system 200/400, in certain embodiments GVR 202/402 and GCC 204/404 can be implemented in the context of a single device. For instance, in one embodiment, GVR 202/402 and GCC 204/404 can be implemented as components in a single network switch/router (such as switch 600 of FIG. 6). In another embodiment, GVR 202/402 and GCC 204/404 can be implemented as components (e.g., virtual machines) within a single computer system (such as computer system 700 of FIG. 7). One of ordinary skill in the art will recognize many variations and modifications for the arrangement of network visibility system 200/400.

Further, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Yet further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method for operating a network visibility system comprising a data plane component and a control plane component, the method comprising:
   receiving, by the control plane component of the network visibility system, one or more first messages from the data plane component of the network visibility system, the one or more first messages comprising information identifying one or more service instances of the data plane component and information identifying one or more egress ports available on the data plane component, wherein the data plane component of the network visibility system is configured to intercept traffic on one or more networks to be monitored and to forward the intercepted traffic to one or more analytic servers;
   retrieving, by the control plane component, configuration information stored on the control plane component, the configuration information comprising one or more network prefixes of one or more networks to be monitored by the network visibility system;
   determining, by the control plane component, one or more mappings that maps the one or more network prefixes to the one or more egress ports and the one or more service instances, wherein determining the one or more mappings comprises using a round-robin matching of the one or more network prefixes to the one or more egress ports and the one or more service instances, each mapping in the one or more mappings identifying a network prefix, a service instance of the data plane component, and an egress port of the data plane component;
   generating, by the control plane component, one or more packet forwarding rules to be programmed on the data plane component based on the one or more mappings, wherein the one or more packet forwarding rules comprise, for at least one mapping of the one or more mappings, at least one packet forwarding rule for forwarding ingress packets destined for an IP address covered by the network prefix in the at least one mapping to the egress port identified in the at least one mapping; and
   transmitting, by the control plane component to the data plane component, one or more second messages including the one or more packet forwarding rules, to program the data plane component;
   generating, at the data plane component and using a whitelist access control list, a whitelist table to filter out part of the intercepted traffic such that the filtered out part of the intercepted traffic is dropped and is not forwarded to the one or more analytic servers;
   determining, by the data plane component and using the whitelist table, a list of one or more packets to be dropped and not to be forwarded to the one or more analytic servers; and
   forwarding, by the data plane component, ingress packets, which are not in the list of one or more packets and are destined for an address covered by the one or more network prefixes in the one or more mappings, to the one or more egress ports identified in the one or more mappings.

2. The method of claim 1, wherein the one or more first messages include port identifiers for ingress ports available on the data plane component, the ingress ports being communicatively coupled with the one or more networks to be monitored.

3. The method of claim 2, wherein the one or more first messages further include port identifiers for the one or more egress ports available on the data plane component, the egress ports being communicatively coupled with the one or more analytic servers.

4. The method of claim 3, wherein each of the one or more service instances corresponds to a processing element configured to perform packet forwarding.

5. The method of claim 1, wherein the information identifying the one or more service instances includes, for each of the one or more service instances, a service instance identifier and a range of entries within a forwarding table of the service instance configured to store the one or more packet forwarding rules.

6. The method of claim 5, wherein each of the one or more service instances is a packet processor resident on the data plane component, and wherein the forwarding table of each of the one or more service instances is a content-addressable memory (CAM) of the packet processor.

7. The method of claim 1, wherein the one or more network prefixes include a gateway GPRS support node (GGSN) prefix in a 3G network to be monitored.

8. The method of claim 1, wherein the one or more network prefixes include a serving gateway (SGW) prefix in a 4G/LTE network to be monitored.

9. The method of claim 1, wherein, upon receiving the at least one packet forwarding rule from the control plane component, the data plane component is configured to program the at least one packet forwarding rule in a forwarding table of the service instance identified in the at least one mapping.

10. The method of claim 1, wherein the generating of the one or more packet forwarding rules is further based on additional configuration information stored on the control plane component.

11. The method of claim 10, wherein the additional configuration information comprises a user-defined zone identifier for at least one network prefix of the one or more network prefixes.

12. The method of claim 1, further comprising:
   receiving, by the control plane component, one or more third messages from the data plane component, the one or more third messages defining a change to the one or more egress ports on the data plane component.

13. The method of claim 12, further comprising:
   modifying, by the control plane component, the at least one mapping based on the change to the one or more egress ports;
   generating, by the control plane component, at least one new packet forwarding rule based on the modified mapping; and
   transmitting, by the control plane component to the data plane component, a fourth message including the at least one new packet forwarding rule.

14. The method of claim 1, wherein the data plane component is a network switch.

15. The method of claim 1, wherein the control plane component is a general purpose computer system.

16. The method of claim 1, further comprising:
   receiving, by the control plane component, one or more third messages from the data plane component, the one or more third messages defining a change to the one or more service instances of the data plane component;

modifying, by the control plane component, the at least one mapping based on the change to the one or more service instances of the data plane component;

generating, by the control plane component, at least one new packet forwarding rule based on the modified mapping; and transmitting, by the control plane component to the data plane component, a fourth message including the at least one new packet forwarding rule.

17. A non-transitory computer readable storage medium having stored thereon program code executable by a network visibility system comprising a data plane component and a control plane component, the program code causing the network visibility system to:

receive, by the control plane component, one or more first messages from the data plane component of the network visibility system, the one or more first messages comprising information identifying one or more service instances of the data plane component and information identifying one or more egress ports available on the data plane component, wherein the data plane component of the network visibility system is configured to intercept traffic on one or more networks to be monitored and to forward the intercepted traffic to one or more analytic servers;

retrieve, by the control plane component, configuration information stored on the control plane component, the configuration information comprising one or more network prefixes of one or more networks to be monitored by the network visibility system;

determine, by the control plane component, one or more mappings that map the one or more network prefixes to the one or more egress ports and the one or more service instances, wherein determining the one or more mappings comprises using a round-robin matching of the one or more network prefixes to the one or more egress ports and the one or more service instances, each mapping in the one or more mappings identifying a network prefix, a service instance of the data plane component, and an egress port of the data plane component;

generate, by the control plane component, one or more packet forwarding rules to be programmed on the data plane component based on the one or more mappings, wherein the one or more packet forwarding rules comprise, for at least one mapping of the one or more mappings, at least one packet forwarding rule for forwarding ingress packets destined for an IP address covered by the network prefix in the at least one mapping to the egress port identified in the at least one mapping;

transmit, by the control plane component to the data plane component, one or more second messages including the one or more packet forwarding rules, to program the data plane component;

generate, at the data plane component and using a whitelist access control list, a whitelist table to filter out part of the intercepted traffic such that the filtered out part of the intercepted traffic is dropped and is not forwarded to the one or more analytic servers;

determine, by the data plane component and using the whitelist table, a list of one or more packets to be dropped and not to be forwarded to the one or more analytic servers; and forward, by the data plane component, ingress packets, which are not in the list of one or more packets and are destined for an address covered by the one or more network prefixes in the one or more mappings, to the one or more egress ports identified in the one or more mappings.

18. A computer system comprising:

one or more processors; and a non-transitory computer readable medium having stored thereon program code that, when executed by the one or more processor, causes the processor to:

receive one or more first messages from a data plane component of a network visibility system, the one or more first messages comprising information identifying one or more service instances of the data plane component and information identifying one or more egress ports available on the data plane component, wherein the data plane component of the network visibility system is configured to intercept traffic on one or more networks to be monitored and to forward the intercepted traffic to one or more analytic servers;

retrieve configuration information stored on the computer system, the configuration information comprising one or more network prefixes of one or more networks to be monitored by the network visibility system;

determine one or more mappings that map the one or more network prefixes to the one or more egress ports and the one or more service instances, wherein to determine the one or more mappings the program code, when executed by the processor, causes the processor to use a round-robin matching of the one or more network prefixes to the one or more egress ports and the one or more service instances, each mapping in the one or more mappings identifying a network prefix, a service instance of the data plane component, and an egress port of the data plane component;

generate one or more packet forwarding rules to be programmed on the data plane component based on the one or more mappings, wherein the one or more packet forwarding rules include, for at least one mapping of the one or more mappings, at least one packet forwarding rule for forwarding ingress packets destined for an IP address covered by the network prefix in the at least one mapping to the egress port identified in the at least one mapping;

transmit, to the data plane component, one or more second messages including the one or more packet forwarding rules, to program the data plane component;

generate, using a whitelist access control list, a whitelist table to filter out part of the intercepted traffic such that the filtered out part of the intercepted traffic is dropped and is not forwarded to the one or more analytic servers;

determine, using the whitelist table, a list of one or more packets to be dropped and not to be forwarded to the one or more analytic servers; and forward ingress packets, which are not in the list of one or more packets and are destined for an address covered by the one or more network prefixes in the one or more mappings, to the one or more egress ports identified in the one or more mappings.

* * * * *